Dec. 13, 1966   F. B. CALKIN   3,291,476
SOLDERING TOOL FOR ELECTRICAL CONNECTIONS
Filed Feb. 3, 1964

INVENTOR
FREEMAN B. CALKIN
BY
ATTORNEYS

United States Patent Office 3,291,476
Patented Dec. 13, 1966

3,291,476
SOLDERING TOOL FOR ELECTRICAL
CONNECTIONS
Freeman B. Calkin, Fremont, Ohio, assignor to Clauss
Cutlery Company, Fremont, Ohio, a corporation of
Ohio
Filed Feb. 3, 1964, Ser. No. 342,118
3 Claims. (Cl. 269—254)

This invention relates to a tool for soldering electrical elements and more particularly to a tool for holding an electrical conductor as it is being tinned or soldered and at the same time for controlling the flow of solder on the conductor.

A soldering tool according to the invention is particularly designed for making connections between conductors and terminals or the like in small electronic components where space is at a minimum and yet where reliability is of prime importance. The tool is also useful in tinning conductors prior to soldering. In electrical work, and particularly in miniature electrical applications, it is required to keep the solder of the connections away from the insulation because it tends to wick under the insulation and prevents a visual inspection of the connection to determine whether the connection was properly made. Where reliability is of utmost importance, visual inspections of every connection is required. Maintaining the solder away from the insulation is often difficult, particularly where the conductor is first coated or tinned to make the solder wet out the conductor and flow more easily thereon. In such instances, the solder readily tends to flow from the bare end of the conductor back to the insulation by a wicking action.

The present invention relates to a soldering tool which is uniquely adapted to both hold the conductor during the soldering operation and to prevent the solder from reaching the insulation of the conductor, spacing it from the insulation by a predetermined distance. The control of solder flow is accomplished by designing the tool to fit tightly around the conductor adjacent the end of the insulation to act as a dam against solder flow. The tool also tightly clamps the conductor at this point and serves as a heat sink to carry away heat from the solder, thereby causing it to solidify and further aid in retarding flow.

It is, therefore, a principal object of the invention to provide a soldering tool for electrical work having the advantages and achieving the results set forth above.

Other objects and advantages of the invention will be apparent from the following detailed description of a preferred embodiment thereof, reference being made to the accompanying drawing, in which:

FIG. 3 is a view in elevation, with parts in cross section, showing how the tool of FIGS. 1 and 2 is employed in effecting a solder connection between a conductor and a terminal or the like.

Figure 1:
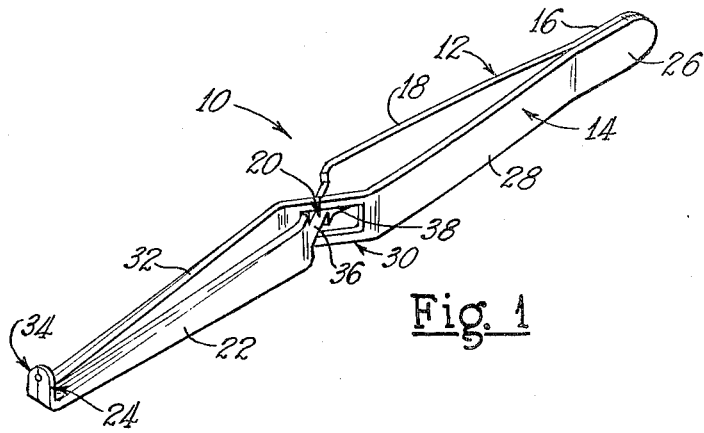
FIG. 1 is a view in perspective of a soldering tool according to the invention.

Referring to the drawing, and more particularly to FIG. 1, a tool embodying the invention is indicated by the reference numeral 10 and is made in two halves 12 and 14. The tool half 12 includes an attaching tab 16, a handle 18, a connecting portion 20, a leg 22, and a jaw generally indicated at 24. Similarly, the half 14 includes an attaching tab 26, a handle 28, a connecting portion 30, a leg 32, and a jaw generally indicated at 34. The handles 18 and 28 are resilient and are urged outwardly from one another so that the jaws 24 and 34 are urged toward one another to the closed position. They then remain closed until the handles 18 and 28 are squeezed by the solderer to force apart the jaws and enable them to receive a conductor.

The attaching tabs 16 and 26 are affixed firmly to one another as by spot welding so that the tool halves 12 and 14 can pivot in a plane which extends transversely to the halves but cannot move perpendicularly to this plane. However, since there is a substantial distance between the jaws 24 and 34 and the attaching tabs 16 and 26, the jaws can be misaligned to some extent even though the tabs remain fixed to one another. To prevent misalignment from occurring or at least minimizing it, the connecting portions 20 and 30 of the two halves are provided with a connecting shank 36 and a slot 38, respectively, which have very close tolerances so that the shank 36 cannot move transversely in the slot 38, a sliding fit between the two being provided. In practice, the width of the slot 38 is designed never to exceed that of the shank 36 by more than about 0.003 inch. The slot and shank cooperation, along with the attaching tabs, thereby provide two spaced support points for the two tool halves so as to maintain these halves in as accurate and as close alignment as possible. Only actual bending of the legs 22 and 32 can cause the two jaws to be misaligned.

Figure 2:
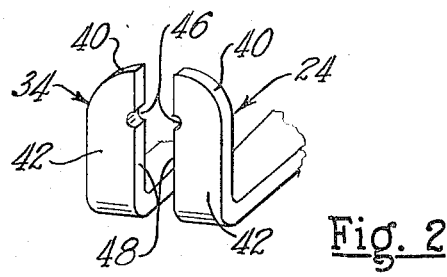
FIG. 2 is an enlarged, fragmentary view of the tool shown in FIG. 1 but in an open position.

Referring more particularly to FIG. 2, the jaw 24 includes a flat flange 40 extending outwardly from the leg 22 and in a plane perpendicular to the longitudinal extent of the leg. The flange 40 has substantially parallel front and back surfaces 42 and 44 (FIG. 3) with a predetermined thickness of 1/32 inch. Approximately two-thirds of the length of the flange from the leg 22 is a semi-cylindrical recess 46, the axis of which lies on a mating edge 48 of the flange 40. The jaw 34 is symmetrically identical with the jaw 24 and includes the same elements.

The two semi-cylindrical recesses 46 are located at identical positions and are of identical diameters so as to meet, when the jaws are closed, to establish a perfectly cylindrical opening through the flanges 40. As previously discussed, the jaws, and particularly the recesses 46 are maintained in alignment by virtue of the attaching tabs 16 and 26 and the slot 38 and the shank 36.

The recesses 46 are of a carefully controlled diameter so as to fit closely with a conductor to be soldered. The tools 10 are individually designed for each size conductor so that seven tools are required for wires in seven gauge sizes 18, 20, 22, 24, 26, 28, and 30, for example. Each of the recesses 46 contact or engage exactly half the periphery of a conductor when used therewith, with the mating edges 48 of the jaw flanges 40 also contacting one another to provide a complete dam or obstruction around the conductor.

Figure 3:
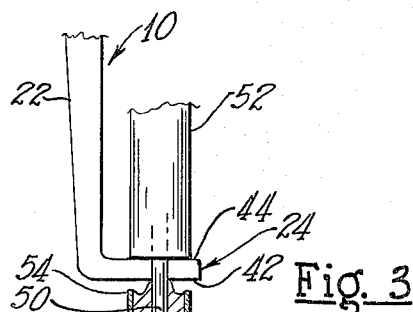

An example of how the soldering tool 10 is employed is shown in FIG. 3. In this instance, an electrical conductor 50 with insulation 52 stripped from the end is to be soldered in a terminal tube 54 of a terminal 56, for example. The tube 54 contains solder and heat is applied to the exterior of the tube 54 when the conductor 50 is to be soldered thereto. As the solder is softened, the conductor 50, preferably first being tinned, is inserted in the tube and held until the solder is cooled to provide a secure connection between the two. Normally, the solder when melted would move up the conductor 50 to the insulation 52. This tends to break down the insulation and render the instrument more vulnerable to short circuits. Also, with the solder extending up to the insulation, whether or not a good electrical connection has been obtained cannot be determined visually. Visual inspection is essential in electronic instruments or various other electrical devices where utmost reliability is of prime importance. Therefore, many specifications, N.A.S.A. specifications for example, require that the solder be spaced from the end of the insulation 52 and the bare-wire spacing between the solder and the insulation usually is specified as a predetermined distance. For example, the N.A.S.A. specifications require this distance to be $\frac{1}{32}$ inch.

To meet these specifications, the jaws 24 and 34 are placed around the conductor 50 with the recesses 46 in contact with the portion of the conductor immediately adjacent the end of the insulation 52. Once the tool is so positioned, the opening force on the handles 18 and 28 can be released so that the jaws hold the tool firmly in position. It is then no longer necessary to separately hold both the tool and the conductor during the soldering operation. Because the tool 10 is parallel to the conductor 50, there is no bending moment applied by the tool to the conductor and the tool and conductor can be readily supported.

With the tool and the conductor positioned properly relative to one another, they are moved downwardly toward the terminal tube 54 as heat is applied and the conductor is then inserted into the conductor tube until the surfaces 42 of the jaws 34 and 40 abut the upper end of the tube to maintain the insulation 52 spaced $\frac{1}{32}$ inch above the tube. At the same time, the flanges 40 completely encompass the adjacent portion of the conductor 50 and act as a dam to prevent the solder from wicking upwardly to the insulation 52. The tool 10 preferably is made of a high heat conducting metal such as a beryllium copper alloy to conduct heat quickly away from the conductor 50 to cool any solder having a tendency to flow beyond the flanges 40. After the heat is removed the solder is allowed to solidify and the handles 18 and 28 can then be pressed to spread the jaws 24 and 34 and enable the tool to be released from the conductor.

The tool is also extremely useful in tinning a conductor, such as the conductor 54, prior to soldering. In this instance, the tool 10 is positioned exactly the same with respect to the conductor 54 as shown in FIG. 3. The tool then prevents the conductor 54 from being tinned all the way back to the insulation 52 in the same manner that it prevents the flow of solder to the insulation.

While the conductor 54 is shown as a single wire, it can be and often is a strand of fine wires.

Various modifications of the above described embodiment of the invention will be apparent to those skilled in the art and it is to be understood that such modifications can be made without departing from the scope of the invention, if they are within the spirit and the tenor of the accompanying claims.

What I claim is:

1. A soldering tool to aid in soldering an insulated conductor to an electrical component, said tool comprising two handles connected for pivotal movement toward and away from one another, means urging said handles away from one another, and legs connected to said handles and extending away from the connection between the handles, said legs having substantially symmetrically identical jaws at corresponding ends thereof, said jaws being urged together by said urging means, each of said jaws comprising a thin flange extending outwardly from the corresponding leg in a plane generally perpendicular to said leg, said flange having substantially parallel opposed major surfaces and having a straight, mating edge located to cooperate with the corresponding straight, mating edge of the other jaw, said jaws lying in a common plane when said mating edges are together, each of said jaws also having a semicylindrical recess at a corresponding point along the mating edge with the axis of the recess lying on the mating edge and extending substantially parallel to the longitudinal extent of said tool, said recesses having diameters such that said flanges are adapted to extend completely around the periphery of the conductor immediately adjacent the conductor insulation with the mating edges of said flanges in contact with one another, whereby said flanges prevent the flow of solder beyond said jaws.

2. A soldering tool according to claim 1 wherein said flanges have a thickness of about $\frac{1}{32}$ inch.

3. A soldering tool according to claim 1 characterized by said recesses being located approximately two-thirds the length of said flanges away from the corresponding legs.

References Cited by the Examiner

UNITED STATES PATENTS

| | | | |
|---|---|---|---|
| 421,925 | 2/1890 | Graves | 81—43 |
| 964,181 | 7/1910 | Phesay | 269—254 |
| 1,979,528 | 11/1934 | Bruce | 269—254 |
| 2,452,332 | 10/1948 | Siptrott | 81—43 |
| 2,646,799 | 7/1953 | Jacoby | 81—43 |
| 3,024,752 | 3/1962 | Marsh | 228—57 |
| 3,215,006 | 11/1965 | Urani | 81—43 |

HAROLD D. WHITEHEAD, *Primary Examiner.*